(12) United States Patent
Izumino et al.

(10) Patent No.: US 7,704,148 B2
(45) Date of Patent: Apr. 27, 2010

(54) TRIPOD TYPE CONSTANT VELOCITY JOINT

(75) Inventors: Junichi Izumino, Shizuoka-ken (JP); Kenta Yamazaki, Shizuoka-ken (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 10/899,309

(22) Filed: Jul. 27, 2004

(65) Prior Publication Data

US 2005/0037849 A1 Feb. 17, 2005

(30) Foreign Application Priority Data

Jul. 31, 2003 (JP) .............................. 2003-284422

(51) Int. Cl.
*F16D 3/26* (2006.01)
(52) U.S. Cl. ....................... 464/111; 464/905
(58) Field of Classification Search ................ 464/111, 464/132, 124, 905
See application file for complete search history.

(56) References Cited

U.S. PATENT DOCUMENTS

| | | | |
|---|---|---|---|
| 4,503,554 A | | 3/1985 | Davis |
| 5,203,741 A | * | 4/1993 | Turner et al. ................ 464/111 |
| 6,478,682 B1 | * | 11/2002 | Kura et al. .................. 464/111 |
| 6,632,143 B2 | * | 10/2003 | Sugiyama et al. ........... 464/111 |
| 6,837,794 B1 | * | 1/2005 | Goto et al. .................. 464/111 |
| 2002/0055388 A1 | * | 5/2002 | Tone et al. .................. 464/111 |
| 2003/0114229 A1 | * | 6/2003 | Kura et al. .................. 464/111 |
| 2003/0130045 A1 | * | 7/2003 | Kura et al. .................. 464/111 |
| 2003/0232655 A1 | | 12/2003 | Perrow |

FOREIGN PATENT DOCUMENTS

| | | |
|---|---|---|
| DE | 43 31 108 C1 | 1/1995 |
| FR | 2 681 390 A1 | 3/1993 |
| FR | 2 785 342 A1 | 5/2000 |
| FR | 2 840 376 A1 | 12/2003 |
| GB | 2 188 701 A | 10/1987 |
| JP | 05-215141 | 8/1993 |
| JP | 09-273566 | 10/1997 |
| JP | 10 184716 A | 7/1998 |
| JP | 2000-046062 | 2/2000 |
| JP | 2001-330049 | 11/2001 |
| WO | WO 02/31373 A | 4/2002 |

* cited by examiner

*Primary Examiner*—Aaron M Dunwoody
(74) *Attorney, Agent, or Firm*—Arent Fox LLP.

(57) ABSTRACT

In a tripod type constant velocity joint, in order to produce a recovery couple to correct the inclination of the rolling direction of a roller and to reduce surface pressure without using angular contact provided by a Gothic arch-shaped roller guide surface, it is arranged that where r1 and r2 are the minimum and maximum values, respectively, of the radius of curvature of the generatrix for the outer peripheral surface of the roller within the range where solid contact is effected by elastic deformation of the contact section between the roller and the roller guide surface under a predetermined torque load with respect to the radius of curvature of the roller guide surface, the radius of curvature (r) of the generatrix be set in the range $r1 \leq r \leq r2$.

9 Claims, 6 Drawing Sheets

TRIPOD TYPE CONSTANT VELOCITY JOINT

BACKGROUND OF THE INVENTION

1. Field of the Invention

This invention relates to a tripod type constant velocity joint, which can be utilized for power transmission in automobiles and various industrial machines. For example, it may be incorporated into the driving system of an automobile to effect transmission of a turning force at constant angular velocity between rotary shafts which are in a non-straight line.

2. Description of the Prior Art

As regards means for solving the problem of shudder in vehicles concerning rotation third-order axial force in tripod type constant velocity joints, tripod type constant velocity joints which are of the so-called double roller type in which an outer roller 4 rolls in parallel with the axis of an outer joint member 1 along a track groove 2 in the outer joint member 1 are described in, for example, Japanese Patent Publication (Kouhyou) Heisei 4-503554 and Japanese Patent Publication (Koukai) Heisei 5-215141 (see FIG. 7). In these tripod type constant velocity joints, the roller guide surface 3 of the outer joint member 1 is shaped in a Gothic arch to ensure that its contact with the roller 4 is in a state of angular contact, thereby generating a recovery couple to correct the inclination (in a plane in FIG. 3) of the rolling direction of the roller 4, it being said that this has the effect of holding the roller 4 in parallel with the track groove.

SUMMARY OF THE INVENTION

In order to establish angular contact with respect to a roller having a limited width, it is necessary to reduce the pressure angle (contact angle) denoted by the reference character P in FIG. 7, with the result that sufficient recovery couple cannot be obtained sometimes. Further, in order to control the contact angle, it is necessary to relatively increase the difference in radius of curvature between the roller guide surface and the generatrix for the outer peripheral surface of the roller. Doing so will result in an increase in contact surface pressure, which would sometimes cause premature wear of the contact region. Either case leads to a lowering in performance, sometimes causing a shudder to occur in a vehicle having the joint mounted thereon.

The present invention is intended to eliminate such problems. That is, the object of the invention is to provide a tripod type constant velocity joint given a construction such that a recovery couple is produced to correct the inclination of the rolling direction of the roller while reducing the surface pressure without using angular contact provided by a Gothic arch-shaped roller guide surface and such that the NVH characteristic is maintained for a long time.

The invention provides a tripod type constant velocity joint comprising an outer joint member formed with track grooves at three equispaced positions on the circumference of the inner peripheral surface, an inner joint member formed with radially projecting leg shafts, or trunnions, at three equispaced positions on the circumference, rollers carried each on the respective trunnions rotatably and oscillably, with the rollers rolling in the track grooves axially of the outer joint member, the tripod type constant velocity joint being characterized in that the radius of curvature of the generatrix for the outer peripheral surface of the roller is smaller than the radius of the outer diameter surface (radius of the cross section of the roller) and in that where r1 and r2 are the minimum and maximum values, respectively, of the radius of curvature of the generatrix for the outer peripheral surface of the roller within the range where solid contact is effected by elastic deformation of the contact section between the roller and the roller guide surface under a predetermined torque load with respect to the radius of curvature of the roller guide surface, the radius of curvature r of the generatrix is set in the range $r1 \leq r \leq r2$.

This setting makes it possible to provide a contact angle over the entire width of the roller and to increase the recovery couple during torque load. Further, the solid contact occurring in the high load region greatly reduces the contact surface pressure to reduce wear of the contact section. In the above setting, the radius of curvature r of the generatrix for the outer peripheral surface of the roller has its allowable range defined to be up to a value slightly smaller than the radius of curvature R of the roller guide surface. Since the roller is of torus shape, an inclination of the roller in the rolling direction results in the same state as the setting r>R, that is, the area of the roller adjacent its widthwise middle separates from the roller guide surface and instead the areas of the roller adjacent its widthwise opposite ends contact the roller guide surface.

To give a concrete example of predetermined torque load, it is not more than ½ of a joint break torque. By the joint break torque is meant, specifically, a torque corresponding to a static torsion breakage torque found from the minimum diameter of the shaft.

The widthwise opposite ends of the outer peripheral surface of the roller may be provided with roundings having a radius of curvature smaller than the radius of curvature of the generatrix in the direction away from the roller guide groove, thereby making it possible to avoid edge load at a widthwise end of the roller.

According to the invention, it is possible to generate a large recovery couple to correct the inclination of the rolling direction of the roller without using angular contact provided by a Gothic arch-shaped roller guide surface and since the contact surface pressure can be reduced, wear is reduced, so that the NVH characteristic can be maintained for a long time.

DESCRIPTION OF THE PREFERRED EMBODIMENTS

Figure 2A:
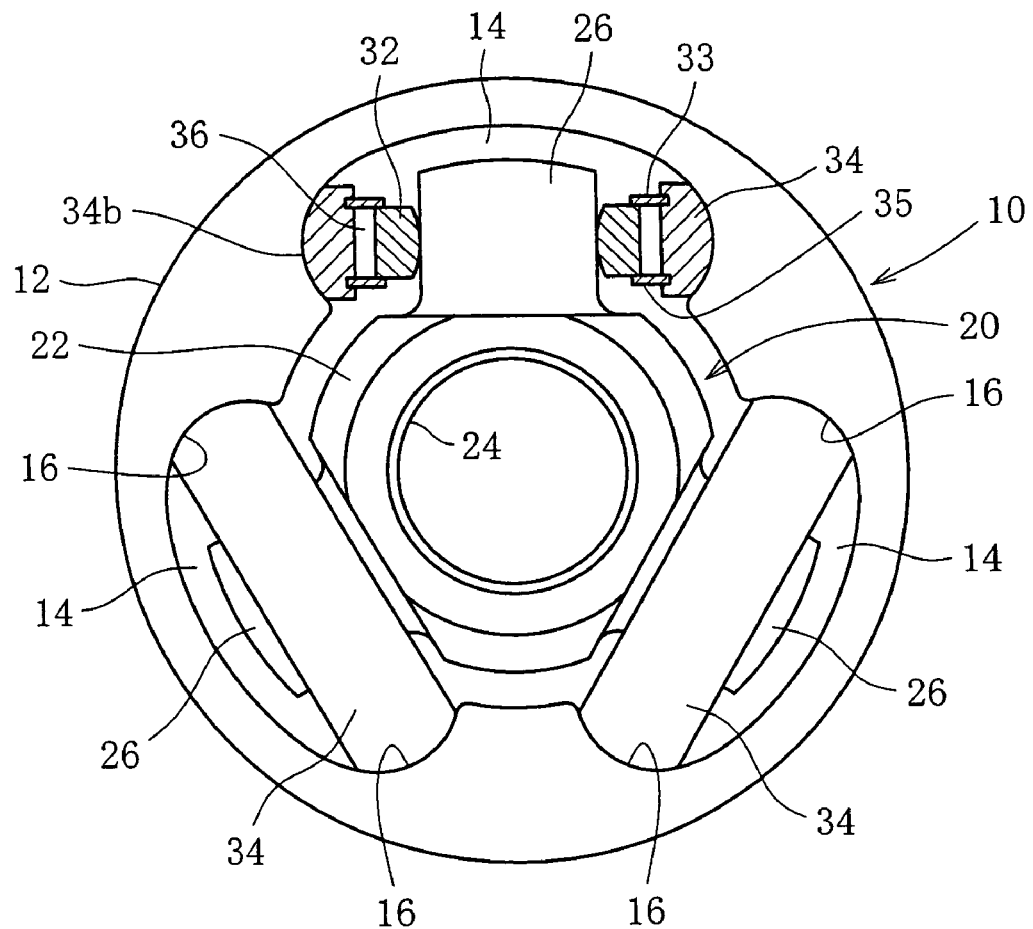
FIG. 2A is an end view, partly in section, of a tripod type constant velocity joint showing an embodiment of the invention.
Figure 2B:
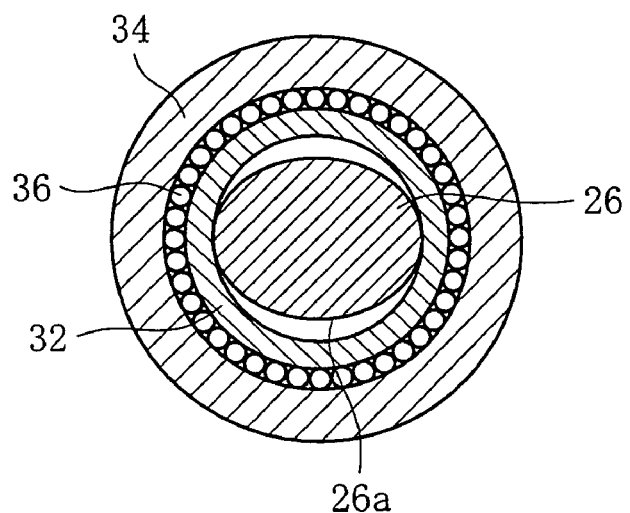
FIG. 2B is a sectional view of a trunnion and a roller assembly, the view being taken normal to the trunnion.
Figure 3:
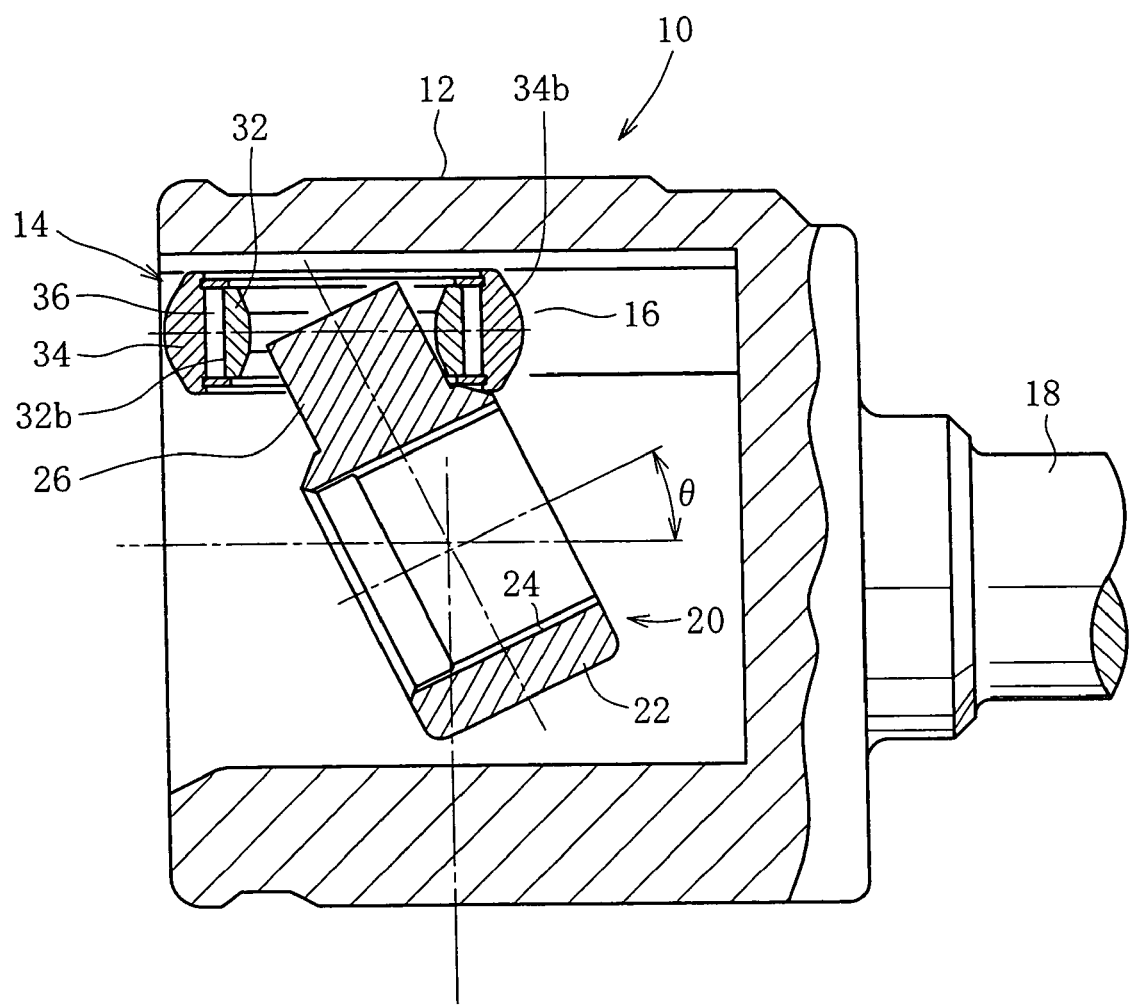
FIG. 3 is a longitudinal sectional view showing a state in which the tripod type constant velocity joint of FIG. 2A has taken an operating angle.

Embodiments of the invention exemplified in the drawings will now be described. First, referring to FIGS. 2A, 2B and 3, the basic construction of a tripod type constant velocity joint will be described. FIG. 2A is an end view of a joint shown partly in section. FIG. 2B is a cross sectional view of a trunnion and a roller assembly. FIG. 3 is a longitudinal sectional view of the joint taking an operating angle θ. As shown, the constant velocity joint comprises an outer joint member 10 and a tripod member 20, wherein one of the two shafts to be connected is connected to the outer joint member 10 and the other is connected to the tripod member 20. The outer joint member 10 comprises a bottomed cylindrical mouth section 12 and a stem section 18, the stem section 18 being in the form of a serrated shaft, through which the outer joint member is connected to one of the two shafts to be connected. Axially extending track grooves 14 are formed at three equispaced positions on the circumference of the inner peripheral surface of the mouth section 12. Each track groove 14 has roller guide surfaces 16 formed in the circumferentially opposed side walls thereof. The tripod member 20 comprises a boss 22 and trunnion 26, the boss 22 being formed with a serrated hole 24, through which the tripod member is connected to the other of the two shafts to be connected. The trunnions 26 radially project from three equispaced positions on the circumference of the boss 22. Each trunnion 26 carries a roller assembly (32, 34, 36). The roller assemblies are received in the track grooves 14 in the outer joint member 10.

In this embodiment, the outer peripheral surface 26a of the trunnion 26, when seen in a cross section (FIG. 2B), is of the shape of an ellipse with its longer diameter crossing the joint axis at right angles, but when seen in a longitudinal section (FIG. 3), it is of straight shape parallel with the trunnion, the cross section remaining the same when taken at any axial position. The cross-sectional shape of the trunnion 26 has a shorter diameter extending axially of the tripod member 20, and the mutually opposed surfaces are retracted in opposite directions from an imaginary cylindrical surface toward the smaller diameter side.

The roller assembly includes a ring 32, a roller 34, and rolling elements 36. The ring 32 is fitted on the trunnion 26, and the ring 32 and the roller 34 are unitized through a plurality of rolling elements 36 to constitute a relatively rotatably roller assembly. That is, the rolling elements 36 are rollably interposed between the cylindrical outer peripheral surface 32b of the ring 32 and the cylindrical inner peripheral surface of the roller 34. In this embodiment, stop rings 33 and 35 are fitted in annular grooves formed in the inner peripheral surface of the roller 34, thereby unitizing the ring 32 and roller 34, preventing slip-off of the rolling elements 36.

Figure 4:
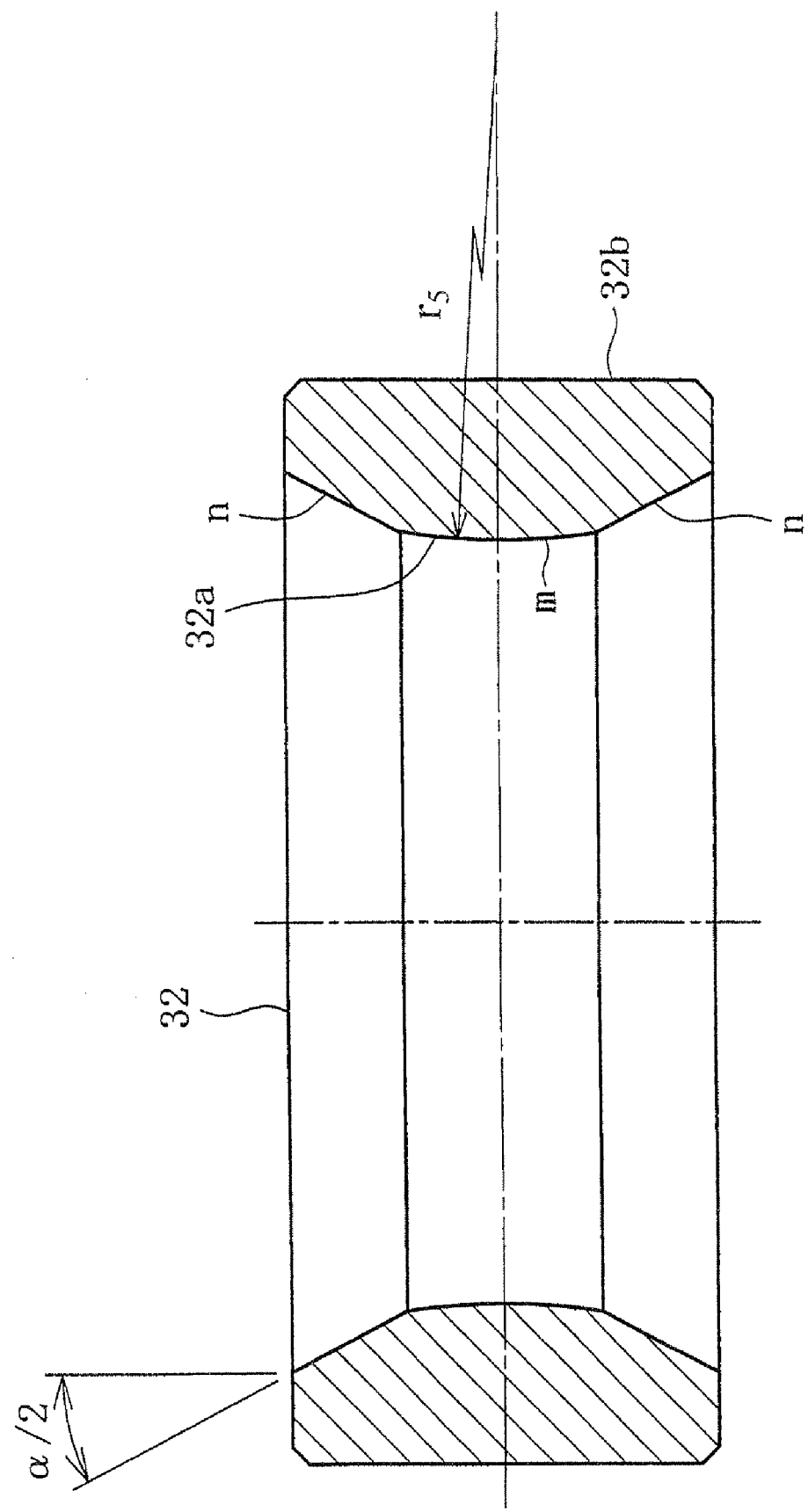
FIG. 4 is an enlarged sectional view of the ring of the tripod type constant velocity joint of FIG. 3.

As shown enlarged in FIG. 4, the inner peripheral surface 32a of the ring 32 is arcuately convex in section. That is, the inner peripheral surface 32a has a generatrix in the form of a convex arc. Whereas the inner peripheral surface 32a of the ring 32 may be in the form of a convex arc over substantially the entire length thereof (see FIG. 2A), in this case, the generatrix for the inner peripheral surface 32a of the ring 32 is a combination of a central arcuate section m and relief sections n on both sides thereof. The relief sections n are portions adapted to avoid interfering with the trunnion 26 when the joint takes a working angle θ as shown in FIG. 3, and are defined by a straight line or curve which is gradually diametrically expanded from the end of the arc m toward the end of the ring 32. In this case, the relief section n is exemplified as part of a conical surface with a conical angle α=50°.

As described above, since the generatrix for the inner peripheral surface 32a of the ring 32 is a convex arc with a radius $r_5$ (FIG. 4) and since the cross-sectional shape of the trunnion 26 is substantially elliptic, with a predetermined clearance defined between the trunnion 26 and the ring 32, the ring 32 is not only movable axially of the trunnion 26 but also oscillable with respect to the trunnion 26. Further, since the ring 32 and roller 34 are relatively rotatably unitized through the rolling element 36, as described above, the ring 32 and roller 34 are in oscillable relation to the trunnion 26 as a unit. Oscillation in this case means that the axis of the ring 32 and roller 34 is tilted with respect to the axis of the trunnion 26 in a plane containing the axis of the trunnion 26 (see FIG. 3) Thus, as a result of the roller 34 being oscillable with respect to the trunnion 26, the roller 34 will roll on the roller guide surfaces 16 while maintaining its posture which is parallel with the axis of the outer joint member even when torque is transmitted with the joint taking an operating angle.

Figure 1A:
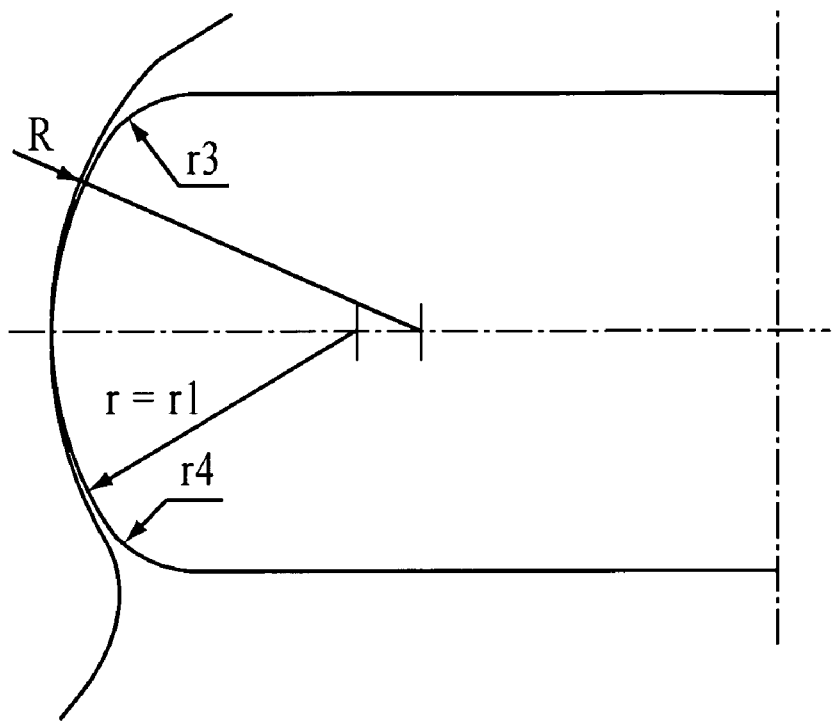
FIG. 1A is a diagram, and a contact section between a roller showing an embodiment of the invention and a roller guide surface identifying the minimum values r1 of the radius of curvature of the generatrix of the outer peripheral surface of the roller.
Figure 1B:
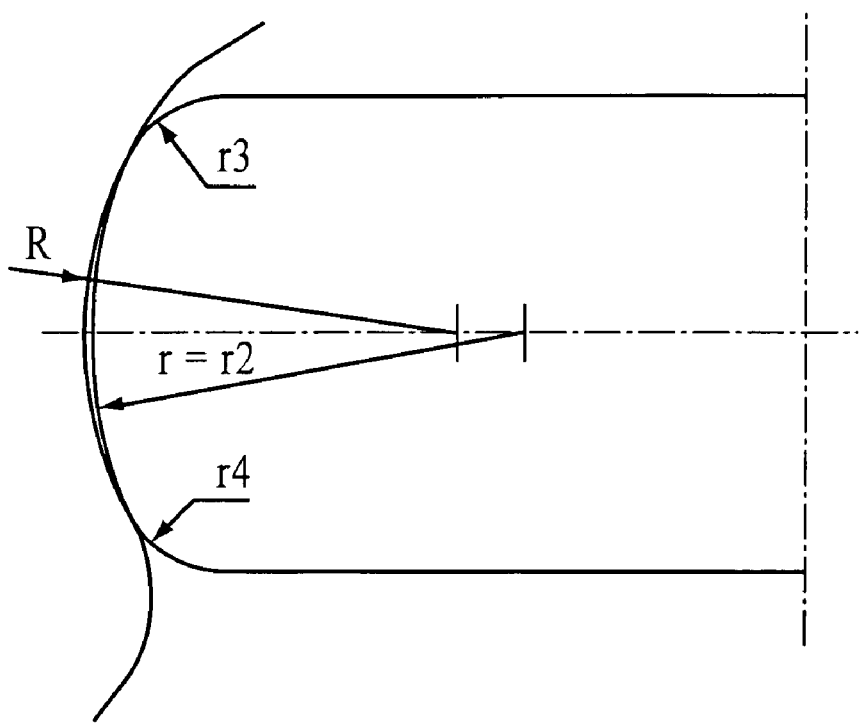
FIG. 1B is a diagram, and a contact section between a roller showing an embodiment of the invention and a roller guide surface identifying the maximum values r2 of the radius of curvature of the generatrix of the outer peripheral surface of the roller.

The roller guide surfaces 16 of the outer joint member 10 contacting the outer peripheral surface 34b of the roller 34 each have an arcuate sectional shape with a radius of curvature R. The generatrix for the outer peripheral surface 34b of the roller 34 is an arc whose center of curvature is located at a point radially spaced from the axis of the roller 34. The radius of curvature r of the generatrix for the outer peripheral surface 34b of the roller 34 is smaller than the radius of the outer diameter surface of the roller 34. Specifically, the radius of curvature r of the generatrix for the outer peripheral surface 34b of the roller 34 is such that where r1 and r2 are the minimum and maximum values, respectively, of the radius of curvature of the generatrix for the outer peripheral surface 34b of the roller within the range where solid contact is effected by elastic deformation of the contact section between the roller 34 and the roller guide surface 16 under the condition that the torque load correspond to not more than a half of the breakage torque for the constant velocity joint with respect to the radius of curvature R of the roller guide surface 16, it is preferably set in the range $r1 \leq r \leq r2$. See FIGS. 1A and 1B.

In the above setting, the radius of curvature r of the generatrix for the outer peripheral surface of the roller has its allowable range defined to be up to a value slightly smaller than the radius of curvature R of the roller guide surface 16. Since the roller 34 is of torus shape, an inclination of the roller 34 in the rolling direction results in the same state as the setting r>R, that is, the area of the roller 34 adjacent its widthwise middle separates from the roller guide surface 16 and instead the areas of the roller adjacent its widthwise opposite ends contact the roller guide surface. This setting makes it possible to provide a contact angle over the entire width of the roller 34 and to increase the recovery couple during torque load. Further, the solid contact occurring in the high load region greatly reduces the contact surface pressure, thereby reducing wear of the contact section.

In the illustrated embodiment, the widthwise opposite ends of the roller 34 are formed with roundings having radii of curvature r3 and r4 smaller than the radius of curvature r of the generatrix so as to be relieved from the roller guide surfaces. This makes it possible to avoid edge load in the widthwise ends of the roller 34.

Figure 5:
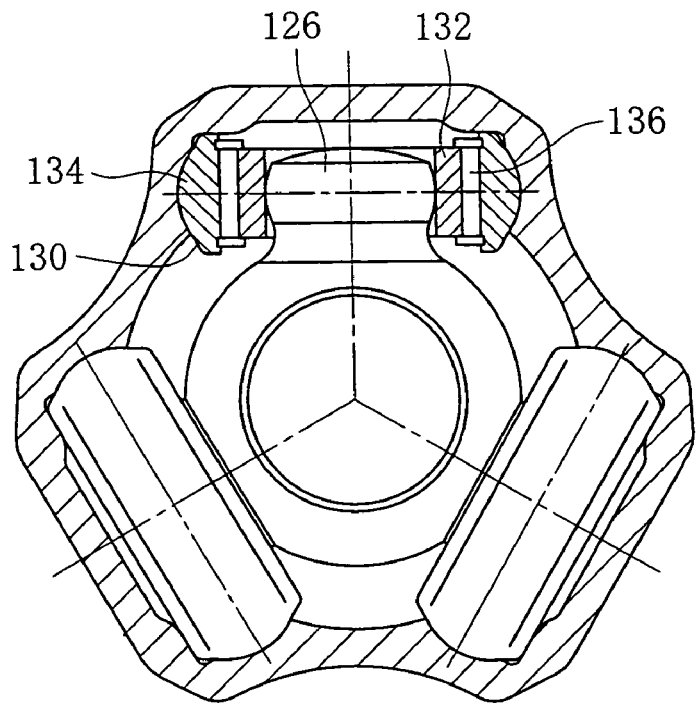
FIG. 5 is a principal sectional view of a tripod type constant velocity joint showing another embodiment of the invention.
Figure 6:
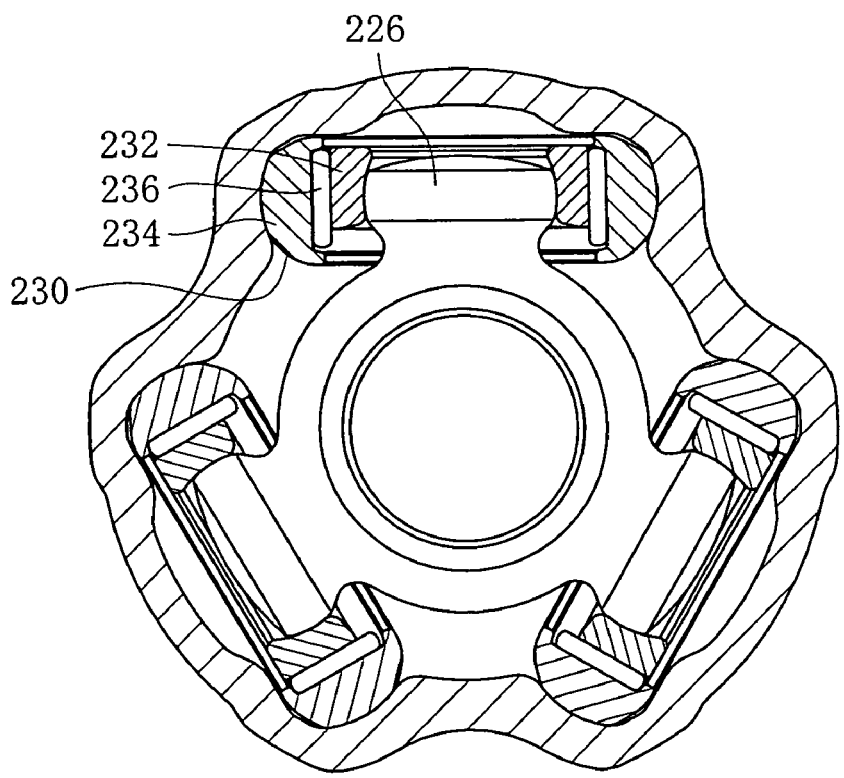
FIG. 6 is a principal sectional view of a tripod type constant velocity joint showing another embodiment of the invention.
Figure 7:
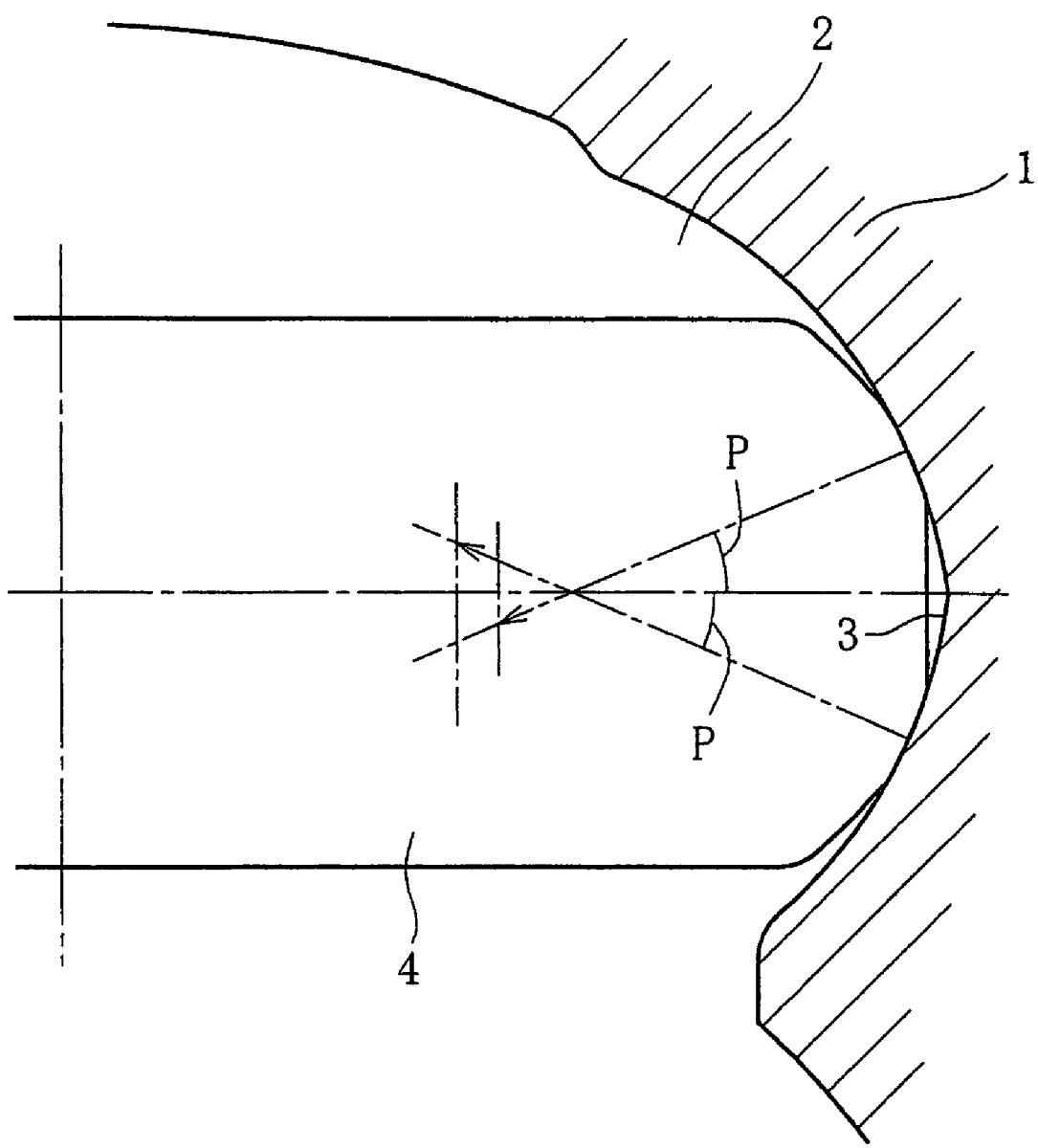
FIG. 7 is a principal sectional view of a tripod type constant velocity joint showing prior art.

FIGS. 5 and 6 show other embodiments. In each case, the roller is rotatable and oscillable with respect to the trunnion, the relation between the radius of curvature of the roller guide surface and the radius of curvature of the generatrix for the outer peripheral surface of the roller is almost the same as in the preceding embodiment, the difference being as follows. In the constant velocity joint of FIG. 5, the roller assembly 130 is composed of a ring 132 and a roller 134 which are relatively rotatable through rolling elements 136, with the cylindrical inner peripheral surface of the ring 132 being fitted on the spherical outer peripheral surface of the trunnion 126. In the constant velocity joint of FIG. 6, the roller assembly 230 is composed of a ring 232 and a roller 234 which are relatively rotatable through rolling elements 236, with the concavely spherical inner peripheral surface of the ring 232 being fitted on the spherical outer peripheral surface of the trunnion 226.

What is claimed is:

1. A tripod type constant velocity joint comprising:
   an outer joint member formed with track grooves at three equi-spaced positions on a circumference of an inner peripheral surface;
   an inner joint member formed with radially projecting trunnions at three equi-spaced positions on a circumference thereof; and
   a plurality of rollers rotatably and oscillably carried on the respective trunnions,
   wherein the rollers roll in the track grooves axially of the outer joint member,
   wherein a radius of curvature of a generatrix for an outer peripheral surface of each roller is greater than a radius of curvature of the inner surface of said each track groove, wherein solid contact is effected between a section of the outer peripheral surface of a roller and the corresponding track groove based on elastic deformation under a predetermined torque load, the predetermined torque load being equal to or less than ½ of the joint break torque,
   wherein widthwise opposite ends of the outer peripheral surface of the roller comprise roundings having a radius of curvature smaller than the radius of curvature of the generatrix for the outer peripheral surface of the roller in a direction away from the roller guide groove.

2. A tripod type constant velocity joint comprising:
   an outer joint member formed with track grooves at three equi-spaced positions on a circumference of an inner peripheral surface;
   an inner joint member formed with radially projecting trunnions at three equi-spaced positions on a circumference thereof; and
   a plurality of rollers rotatably and oscillably carried on the respective trunnions, wherein each of the plurality of rollers include:
      an inner ring configured to surround a projecting trunnion;
      an outer roller surrounding the inner ring; and
      a plurality of rolling elements located between the inner ring and the outer roller,
   wherein the rollers roll in the track grooves axially of the outer joint member,
   wherein a radius of curvature of a generatrix for an outer peripheral surface of each roller is greater than a radius of curvature of the inner surface of said each track groove, wherein the solid contact is effected between a section of the outer peripheral surface of a roller and the corresponding track groove based on elastic deformation under a predetermined torque load, the predetermined torque load being equal to or less than ½ of the joint break torque.

3. The tripod type constant velocity joint according to claim 2, wherein the inner peripheral surface of the ring is a convex arc.

4. The tripod type constant velocity joint according to claim 2, wherein the inner peripheral surface of the ring includes a central arcuate section and a relief section.

5. The tripod type constant velocity joint according to claim 2, wherein the inner peripheral surface of the ring is cylindrical and the outer peripheral surface of the trunnion is spherical.

6. The tripod type constant velocity joint according to claim 2, wherein the inner peripheral surface of the ring is concave and the outer peripheral surface of the trunnion is spherical.

7. The tripod type constant velocity joint according to claim 6, wherein the concave, inner peripheral surface of the ring is fit to the spherical outer peripheral surface of the trunnion.

8. The tripod type constant velocity joint of claim 1, wherein the inner surface of each track groove has a non-gothic arch shape.

9. The tripod type constant velocity joint of claim 2, wherein the inner surface of each track groove has a non-gothic arch shape.

* * * * *